(12) United States Patent
Way (10) Patent No.: US 9,722,722 B2
(45) Date of Patent: Aug. 1, 2017

(54) DENSE WAVELENGTH DIVISION MULTIPLEXING AND SINGLE-WAVELENGTH TRANSMISSION SYSTEMS

(71) Applicant: NeoPhotonics Corporation, San Jose, CA (US)

(72) Inventor: Winston I. Way, Irvine, CA (US)

(73) Assignee: NEOPHOTONICS CORPORATION, San Jose, CA (US)

(*) Notice: Subject to any disclaimer, the term of this patent is extended or adjusted under 35 U.S.C. 154(b) by 0 days.

(21) Appl. No.: 14/859,455

(22) Filed: Sep. 21, 2015

(65) Prior Publication Data

US 2016/0087747 A1    Mar. 24, 2016

Related U.S. Application Data

(63) Continuation of application No. 14/745,371, filed on Jun. 19, 2015, now abandoned.

(Continued)

(51) Int. Cl.
*H04J 14/02* (2006.01)
*H04B 10/54* (2013.01)
(Continued)

(52) U.S. Cl.
CPC .......... *H04J 14/0221* (2013.01); *H04B 10/40* (2013.01); *H04B 10/524* (2013.01); *H04B 10/541* (2013.01)

(58) Field of Classification Search
CPC .. H04B 10/541; H04B 10/40; H04B 10/6161; H04B 10/2525
See application file for complete search history.

(56) References Cited

U.S. PATENT DOCUMENTS 7,380,993 B2   6/2008  Dallesasse
8,433,202 B2   4/2013  Way
(Continued)

FOREIGN PATENT DOCUMENTS

WO   2014130386 A1   8/2014

OTHER PUBLICATIONS

Sadot, Dan et al. "Single channel 112Gbit/sec PAM4 at 56gbaud with digital signal processing for data centers applications," Jan. 16, 2015, vol. 23, No. 2 (7 pages).
Chan, T. and Way, W. "112 Gb/s PAM4 Transmission Over 40km SSMF Using 1.3μm Gain-Clamped Semiconductor Optical Amplifier," Optical Fiber Communications Conference (OFC), p. Th3A.4, Mar. 2015.
(Continued)

*Primary Examiner* — Dzung Tran
(74) *Attorney, Agent, or Firm* — Buchanan Ingersoll & Rooney PC (57) ABSTRACT

A data transceiver module, data transmission system incorporating same and methods related thereto, which include optical transmitters configured to receive an information bearing signal and generate an optical signal having a wavelength different from wavelengths generated by others of the plurality of optical transmitters; optical receivers configured to receive an optical signal having a wavelength matching one of the plurality of optical transmitters and convert it to an information bearing electrical signal; and a four level pulse-amplitude-modulator (PAM4) chip generating a pulse-amplitude-modulated information bearing signal input to at least one optical transmitter of the plurality of optical transmitters and receiving the information bearing from at least one optical receiver of the plurality of optical receivers and converting it to an information signal using pulse amplitude demodulation. Alternative embodiments include coherent-detection-based optical coherent receiver and coherent transmitter.

37 Claims, 6 Drawing Sheets

Related U.S. Application Data (60) Provisional application No. 62/052,862, filed on Sep. 19, 2014.

(51) Int. Cl.
  *H04B 10/40*    (2013.01)
  *H04B 10/524*   (2013.01)

(56) References Cited

U.S. PATENT DOCUMENTS

| | | | |
|---|---|---|---|
| 2003/0108118 A1* | 6/2003 | Gorecki | H04L 1/0057 375/295 |
| 2008/0069570 A1 | 3/2008 | Dallesasse | |
| 2009/0110408 A1* | 4/2009 | Dallesasse | H04B 10/504 398/185 |
| 2012/0207470 A1 | 8/2012 | Djordjevic et al. | |
| 2012/0327818 A1* | 12/2012 | Takatori | H04L 5/14 370/277 |
| 2014/0169789 A1* | 6/2014 | Bhoja | H04B 10/541 398/45 |
| 2015/0086216 A1* | 3/2015 | Xie | H04B 10/54 398/186 |

OTHER PUBLICATIONS

International Search Report and Written Opinion issued by the International Searching Authority on Feb. 19, 2016 in cognate PCT/US2015/051124 (19 pages).

\* cited by examiner

DENSE WAVELENGTH DIVISION MULTIPLEXING AND SINGLE-WAVELENGTH TRANSMISSION SYSTEMS

RELATED APPLICATIONS

This application claims priority to U.S. Provisional Application No. 62/052,862, by Winston I. Way, filed on Sep. 19, 2014, and U.S. Non-provisional application Ser. No. 14/745,371, by Winston I. Way, filed on Jun. 19, 2015, both of which are herein incorporated by reference in their entirety. Further, this technology is related to that disclosed in U.S. Pat. No. 8,433,202 by Winston I. Way, issued on Apr. 30, 2013, herein incorporated by reference.

FIELD

The present disclosure relates to high capacity data center interconnection using optical transmission, specifically the use of optical dense wave division multiplexing using pulse-amplitude-modulation with four levels (PAM4 modulation) and single-wavelength using coherent-detection-based modulation to transmit significant amounts of data over large distances for data center interconnection.

BACKGROUND

The rise of more and more smart devices in the world, in addition to the significant amount of streaming media and cloud-based computing, has resulted in a drastic increase in the amount of traffic that occurs between data centers. As such, methods are often developed in order to increase the speed at which data may be transferred between data centers, or to increase the amount of data that may be transferred using an interconnection. However, in many instances, such newly developed methods are often inefficient in terms of the bandwidth necessary to accomplish the improved speed and/or size of data transfer, and/or the costs associated with such improvements.

Thus, there is a need for a technical solution to provide for a data transmission system that can transfer large amounts of data between data centers in a cost-effective and/or spectrally efficient manner.

SUMMARY

The present disclosure provides a description of systems and methods for data transmissions in a data transmission system. A data transceiver module comprising: a plurality of optical transmitters, each optical transmitter being configured to receive a modulated signal and generate an optical signal having a wavelength different from wavelengths generated by others of the plurality of optical transmitters; a plurality of optical receivers, each optical receiver being configured to receive an optical signal having a wavelength matching one of the plurality of optical transmitters and convert it to an information bearing electrical signal; and a four level pulse-amplitude-modulator (PAM4) chip generating a pulse modulated information bearing signal input to at least one optical transmitter and receiving the information bearing from at least one optical receiver and converting it to an information signal used pulse amplitude demodulation.

Figure 1:
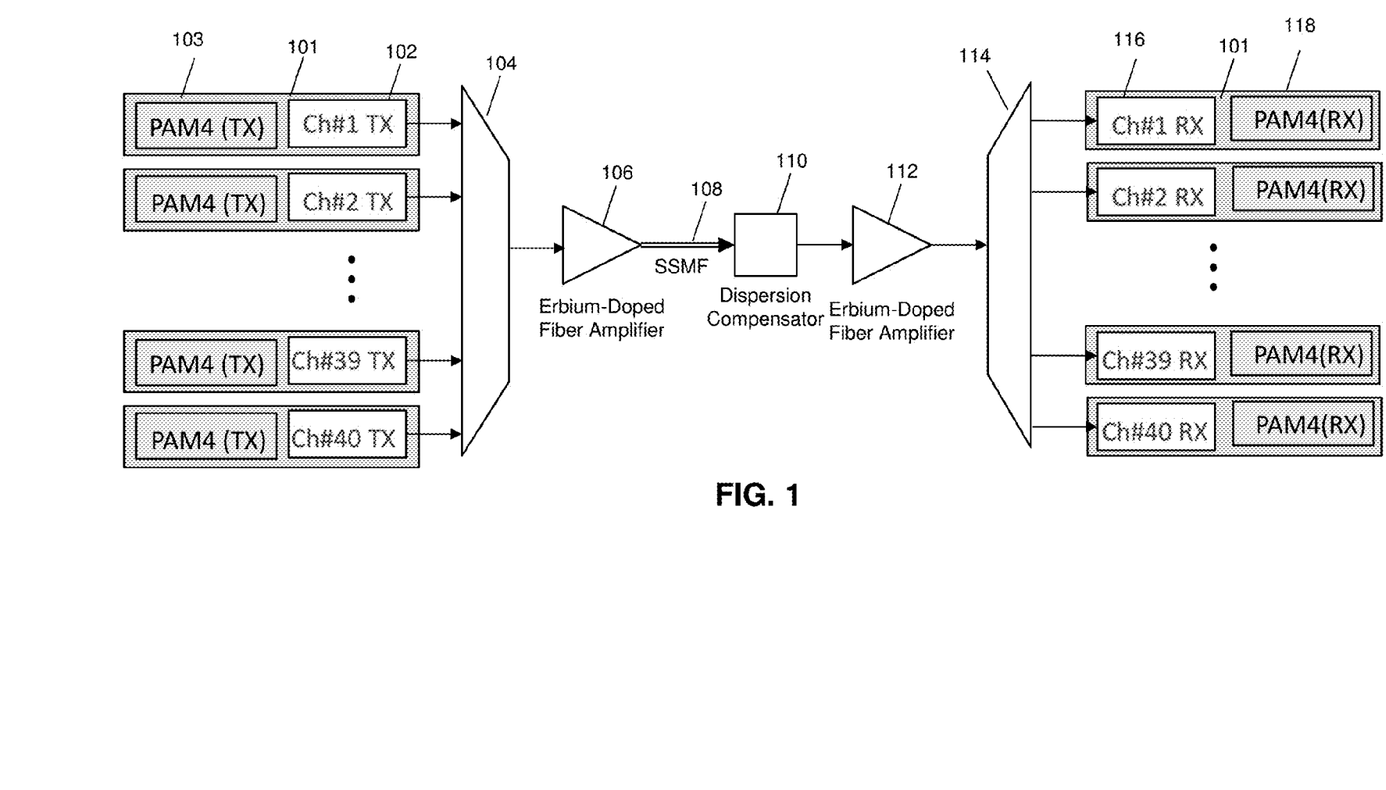
FIG. 1 is a block diagram illustrating a high capacity DWDM PAM4 data transmission system with ≥100 Gb/s per wavelength in accordance with exemplary embodiments.

As shown in the exemplary embodiment of FIG. 1, a data transmission system 100 comprises: a plurality of 30 GHz optical transmitters 102 (Ch#1 TX through Ch#40 TX in FIG. 1), each optical transmitter including a four level pulse-amplitude-modulation (PAM4) chip 103 configured to generate an optical signal having a wavelength using PAM4 modulation and with 1000 Gb/s data rate; a multiplexer 104 serially connected to each of the plurality of optical transmitters configured to multiplex the optical signals generated by each optical transmitter into a single optical dense-wavelength-division-multiplexed (DWDM) signal; a first erbium-doped fiber amplifier (EDFA) 106 serially connected to the multiplexer and configured to amplify the single optical DWDM signal; a single-mode-fiber link 108 serially connected to the first EDFA configured to transmit the amplified single optical DWDM signal; a dispersion compensator 110 configured to receive the single optical DWDM signal transmitted by the single-mode-fiber link and compensate for accumulated fiber chromatic dispersion; a second EDFA 112 serially connected to the dispersion compensator and configured to amplify the compensated single optical DWDM signal; a demultiplexer 114 serially connected to the second EDFA 112 configured to demultiplex the amplified, compensated single optical DWDM signal into a plurality of compensated optical wavelengths; and a plurality of optical receivers, each optical receiver being serially connected to the demultiplexer and configured to receive one of the plurality of compensated optical wavelengths; and a PAM4 chip controlling the receiver to demodulate the received optical wavelengths.

Figure 2:
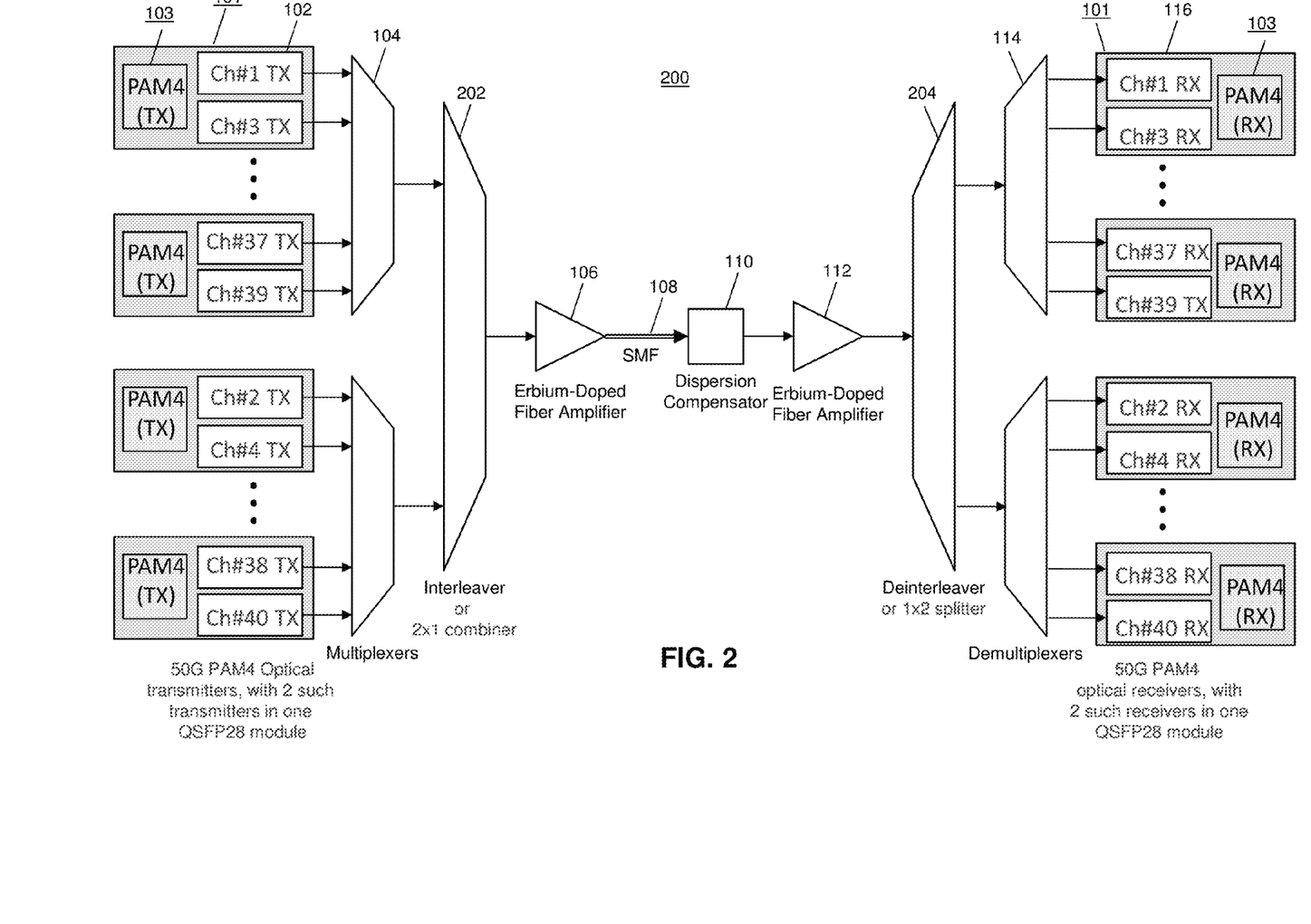
FIG. 2 is a block diagram illustrating a high capacity DWDM PAM4 data transmission system with ≥50 Gb/s per wavelength in accordance with exemplary embodiments.

As shown in the exemplary embodiment of FIG. 2, a data transmission system comprises: a plurality of PAM4 100 Gb/s optical transceiver modules, each consisting of an electrical PAM4 chip generating two signals of 50 Gb/s data, with each 50 Gb/s data signal driving two 10G optical transmitters with a total of two wavelengths and therefore two output optical fibers; a multiplexer serially connected to each of the plurality of optical 100 Gb/s transceivers configured to multiplex the two wavelength of the optical transceiver modules into a single optical DWDM signal; a first erbium-doped fiber amplifier (EDFA) serially connected to the multiplexer, amplifying the single optical DWDM signal; a single-mode-fiber link serially connected to the first EDFA, configured to transmit the amplified single optical signal; a dispersion compensator configured to receive the single optical DWDM signal transmitted by the single-mode-fiber link, and compensate the single optical DWDM signal to compensate for accumulated fiber chromatic dispersion; a second EDFA serially connected to the dispersion compensator, configured to amplify the compensated single optical signal; a demultiplexer serially connected to the second EDFA, configured to demultiplex the amplified, compensated single optical DWDM signal into a plurality of compensated optical wavelengths; and a plurality of 100 Gb/s optical transceiver modules each consisting of two optical receivers, receiving the plurality of compensated optical signals, wherein each optical receiver is serially connected to the demultiplexer and configured to receive one of the plurality of compensated 50 Gb/s optical wavelengths. The received electrical 50 Gb/s signal is then sent to a PAM4 chip within the 100 Gb/s optical transceiver for demodulation and decoding.

A data transmission system includes: a plurality of ≥30 GHz optical transmitters, each optical transmitter being configured to generate an optical signal having a wavelength using PAM4 modulation and with ≥100 Gb/s data rate; a multiplexer serially connected to each of the plurality of optical transmitters configured to multiplex the optical signal generated by each optical transmitter into a single optical dense-wavelength-division-multiplexed (DWDM) signal; a first erbium-doped fiber amplifier (EDFA) serially connected to the multiplexer and configured to amplify the optical single signal; a single-mode-fiber link serially connected to the first EDFA configured to transmit the amplified single signal; a dispersion compensator configured to receive the optical single signal transmitted by the single-mode-fiber link and compensate for accumulated fiber chromatic dispersion; a second EDFA serially connected to the dispersion compensator configured to amplify the compensated single optical DWDM signal; a demultiplexer serially connected to the second EDFA configured to demultiplex the amplified, compensated single optical DWDM signal into a plurality of compensated optical wavelengths; and a plurality of optical receivers, each optical receiver being serially connected to the demultiplexer and configured to receive one of the plurality of compensated optical wavelengths. Each optical transmitter and receiver can be contained within a single optical module.

A method for transmitting data in a data transmission system includes: generating, by using an optical coherent transmitter using dual-polarization n-ary quadrature-amplitude modulation (DP-nQAM) (n≥4) with a data rate of ≥100 Gb/s; amplifying the DP-nQAM optical signal by a first erbium-doped fiber amplifier (EDFA) serially connected to the optical coherent transmitter; transmitting the amplified DP-nQAM optical signal by a single-mode-fiber (SMF) link serially connected to the first EDFA; amplifying the transmitted DP-nQAM optical signal by a second EDFA serially connected to the SMF link; and receiving the received DP-nQAM optical signal by a coherent-detection-based 100 Gb/s optical coherent receiver. The transmitter may use a non-tunable, C-band laser. The receiver may be a single wavelength, C-band, high-sensitivity coherent receiver. A regular coherent receiver may be used when EDFAs are used. An electronic DP-nQAM chip consisting of an analog-to-digital converter (ADC), a digital-to-analog converter (DAC), and digital-signal-processor (DSP) can be co-packaged with the optical coherent transmitter and optical coherent receiver. The electronic DP-nQAM chip can also be sitting outside the package of the optical coherent transmitter and optical coherent receiver.

A method for transmitting data in a data transmission system includes: generating an optical information bearing signal by using a coherent optical transmitter using dual-polarization n-array quadrature-amplitude modulation (DP-nQAM) (n≥4) with a data rate of ≥100 Gb/s; transmitting the optical DP-nQAM modulated signal by a single-mode-fiber (SMF) link serially connected to the optical coherent transmitter; and receiving the transmitted optical DP-nQAM modulated signal by a coherent-detection-based ≥100 Gb/s coherent optical receiver. As with the above embodiment, the transmitter may use a non-tunable, C-band laser. If EDFAs are not used, the receiver may be a C-band, high-sensitivity coherent receiver. A regular coherent receiver may be used when EDFAs are used. An electronic DP-nQAM chip including an analog-to-digital converter (ADC), a digital-to-analog converter (DAC), and digital-signal-processor (DSP) can be co-packaged with the optical coherent transmitter and optical coherent receiver. The electronic chip can also be sitting outside the package of the optical coherent transmitter and optical coherent receiver.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for High Capacity PAM4 Data Transmission

FIG. 1 illustrates a data transmission system 100 which, depending on implementation, can achieve high capacity transmission of data in a data transmission system designed to use PAM4 optical transmitters with 100 Gb/s per wavelength to efficiently transmit a high capacity of data over long distances, such as for data center interconnections, over a single-mode-fiber link. In some instances, the data transmission system 100 may be a dense wavelength division multiplexing (DWDM) system.

As shown in the exemplary embodiment of FIG. 1, a data transmission system 100 includes a plurality of optical transmitters 102. In an exemplary embodiment, the optical transmitters 102 may be 30 GHz optical transmitters configured to transmit data signals at 100 Gbps. Signals generated by the optical transmitters 102 may be of a specific frequency. In some instances, each optical transmitter 102 may generate a signal having a frequency that is different from the signals generated by each of the other optical transmitters 102. In further instances, the different frequencies may be equally spaced or spaced at different intervals. As shown, there are 40 transmitters 102, but the actual number may vary based on design parameters, such as desired total transmission rate. In embodiments where 100 Gb/s PAM4 optical transmitters are used, the optical transmitters 102 may be comprised of multiple components, including, for example, a PAM4 chip 103 (which contains encoder, decoder, timing recovery, serializer, de-serializer, digital signal processor (DSP), a digital-to-analog converter (DAC) and an analog-to-digital converter (ADC)), a linear driver amplifier, a modulator, and a tunable or fixed-wavelength laser. The optical signal in each optical transmitter 102 may be modulated by a direct detection-based pulse-amplitude-modulation using a pulse-amplitude-modulator 103 with four amplitude level optical transmitters that is configured to generate an optical signal having a prescribed wavelength using PAM4 modulation and with ≥100 Gb/s data rate in this embodiment. Pulse-amplitude modulation (PAM) is a form of signal modulation in which message information is encoded in the amplitude of a series of regularly timed signal pulses. That is, the amplitudes of a train of carrier pulses are varied according to the sample value of the message signal. While the number of possible pulse amplitudes can be infinite in the case of analog PAM, the number is usually some power of two, so that the resulting output signal can be digital. In a 4-level PAM there are 2^2 possible discrete pulse amplitudes. PAM8 and PAM16 may be used but at the time of the writing of this application are not practical for fiber links of 40 km or greater. To demodulate the signal, the amplitude level of the carrier is detected at every symbol period.

The PAM4 chip 103 and the optical transmitters 102 can be housed in a commercially available quad small form factor pluggable (QSFP) module 101, such a QSFP28 module and is therefore backwards compatible in the hardware housing (e.g., slots and racks) of preexisting fiber optic systems. Other form factors can be used, but being able to be placed in a commonly used one is of significant advantage.

The data transmission system 100 further includes a wavelength-division multiplexing (WDM) multiplexer 104, inputs of which are serially connected to respective plurality of different wavelengths output from the plurality of optical transmitters (each with one or two output optical fibers). The multiplexer 104 is configured to multiplex the optical signals generated by each optical transmitter into a single optical DWDM output signal. The output of the multiplexer 104 is serially connected to the input to a first erbium-doped fiber amplifier (EDFA) 106, which is configured to amplify the single optical DWDM signal prior to transmission to the receiving end of the data transmission system 100. The optical gain of the first EDFA 106 may be based on the length of the data transmission, the number of the wavelengths, and other such factors that will be apparent to persons having skill in the relevant art. An EDFA is a device that amplifies an optical fiber signal which, in general, works on the principle of stimulating the emission photons. The first EDFA includes a variable optical attenuator configured to attenuate the amplified single optical signal prior to transmission via the single-mode-fiber link.

In some embodiments, the multiplexer 104 may have up to 96 channels that can be multiplexed together. In such instances, ≤48 optical transceiver modules containing ≤96 53~56 Gb/s PAM4 optical transmitters or ≤48 optical transceiver modules containing ≤48 106~112 Gb/s PAM4 optical transmitters 102 may be connected to the multiplexer 104 for example.

In this exemplary embodiment, a standard single-mode-fiber (SMF) link 108 serially connected to the output of the first EDFA 106 and is configured to transmit the amplified single optical DWDM signal to the input of a dispersion compensator 110. The SMF link 108 may be many kilometers long, traversing the distance between data centers, for example. The SMF link 108 may be, for example, a 40~100 km link.

At the receiving end of the data transmission system 100, the SMF link 108 may be serially connected to a dispersion compensator 110 to which the single DWDM signal is sent.

The dispersion compensator 110 may be configured to compensate the signal transmitted via the SMF link for any fiber chromatic dispersion (CD) that accumulates as a result of the transmission of the signal. In some embodiments, the dispersion compensator 110 may be a tunable dispersion compensator (DCM). In other embodiments, a fixed dispersion compensator or dispersion compensation fiber (DCF) may be used as the dispersion compensator 110. In some instances, a combination of a tunable DCM and a DCF may be used to compensate for accumulated fiber CD. In an exemplary embodiment, a single tunable DCM may be used. In such cases, the tunable DCM may be preferred as tuning may be beneficial due to variance in length of the SSMF link 108. In some instances, the DCM may be a fiber-Bragg-grating-based DCM. Further, the transmission system 100 can include a tunable dispersion compensator (not illustrated) in combination with a fixed dispersion compensator (not illustrated) in the transmission system 100.

In the embodiment shown in FIG. 1, a second EDFA 112 is serially connected to the output of the dispersion compensator 110 and is configured to amplify the dispersion compensated single optical DWDM signal. That is, once the dispersion compensator 110 has compensated the accumulated CD in the transmission link 108, the compensated signal may be sent to a serially connected, second EDFA 112. The second EDFA 112 may be configured to amplify the compensated signal, such as to compensate for any loss suffered via transmission over the SMF link 108 and the dispersion compensator 110. The amount of amplification provided by the second EDFA 112 to the signal may be based on the strength of the signal as sent by the dispersion compensator 110, the length of the SMF link 108, and the latter components in the receiving end of the data transmission system 100 that are to receive the signal after amplification. The second EDFA 112 may include a variable optical attenuator configured to attenuate the transmitted single optical signal prior to demultiplexing by the demultiplexer.

A demultiplexer 114 is serially connected to the output of the second EDFA and is configured to demultiplex the amplified, dispersion compensated single optical DWDM signal into a plurality of compensated optical wavelengths for output at respective separate outputs of the demultiplexer 114. The second EDFA 112 may be serially connected to a demultiplexer 114. In an exemplary embodiment, the demultiplexer 114 may have the same number of channels as the multiplexer 104 and may be configured to separate the DWDM signal into the same number of wavelengths multiplexed by the multiplexer 104. For example, if the multiplexer 104 multiplexes forty dual-channel signals, the demultiplexer 114 may demultiplex the amplified, compensated signal into forty dual-channel signals. However, as long as the multiplexer 104 and the demultiplexer 114 have the minimum number of channels for a give design, either or both can have more available channels than are used.

The demultiplexer 114 may be serially connected to a plurality of optical receivers 116, which may be in the form of a receiver optical sub assembly (ROSA) or as part of the data transceiver module 101. Each of the optical receivers 116 may be configured to receive one of the wavelengths generated by the demultiplexer 114 via the demultiplexing of the amplified, compensated signal. In an exemplary embodiment, the number of optical receivers 116 may be equal to the number of optical transmitters 102. In some embodiments, the optical receivers 116 may include a p-type, intrinsic n-type diode (PIN) photodiode (which increases its electrical conductivity as a function of the intensity, wavelength and most topically the modulation rate of the impinging light) and a trans impedance amplifier (TIA). Alternatively, it can include an avalanche photodiode (APD) and a TIA. In some instances, each optical receiver 116 may include a linear PIN-TIA receiver. The receivers 116 may include the receiving part (e.g., timing recovery, PAM4 decoder, digital signal processor (DSP), forward-error-correction decode (FEC), etc.) of a PAM4 chip 103, acting as a PAM4 demodulator 118. Each PAM4 chip is configured to de-serializing the 4×25 Gb/s non-return to zero (NRZ) data, and serialize the NRZ data into two streams of 50 Gb/s PAM4 data in one direction, and reverse the signal processing sequence in a different direction. Each PAM4 chip includes a digital to analog converter (DAC), an analog to digital converter (ADC), in addition to the digital signal processing (DSP) unit, and the forward error correction (FEC) codec, in exemplary embodiments.

The optical receivers 116 and PAM4 demodulator circuitry 118 of the PAM4 chip 103 may be housed in a QSFP module 117, such as QSFP28 module for instance. Each optical receiver 116 should have a bandwidth of approximately equal to or greater than 15 GHz in the exemplary embodiment to receive a 50 Gb/s PAM4 signal.

As yet another alternative embodiment, a plurality of >30 GHz optical transmitters and receivers can be used, wherein each optical transmitter being configured to generate an optical signal having a wavelength using PAM4 modulation and with 100 Gb/s data rate. This would be instead of the 10 GHz optical transmitters configured to transmit data signals at 100 Gbps. Higher data rate systems (e.g., 200G, 400G, . . . ) would follow similar architectures represented by the diagrams in FIGS. 1 and 2, with higher data rates on each of the wavelength channels. The QSFP package or other form factors could be used.

It is emphasized that the above components may also form an optical transceiver module 101 that is composed of two 50 Gb/s optical transmitters 102 with two separate wavelengths, two 50 Gb/s optical receivers 116, and a single 2×50 Gb/s PAM4 chip that is used on the transmitter side that transmits a single optical DWDM signal to the SMF link 108 and acts on the receiver side to receive a different single optical DWDM signal transmitted from a remote data center or the like. The PAM4 chip 103 has both components for transmission and reception, as explained above. This transceiver module 101 may be housed in a single QSFP module, such as QSFP28 module for instance.

FIG. 2 illustrates an alternative data transmission system 200 that uses similar components as the embodiment of FIG. 1, which are identified as such by like reference numbers. In the alternative data transmission system 200, the data transmission system 200 may include a plurality of multiplexers 104 and demultiplexers 114 to accommodate a larger number of overall channels as used in the data transmission system 100 or to use the same number of channels as in the data transmission system 100 but using smaller multiplexers 104 and demultiplexers 114. For example, if the data transmission system 100 of FIG. 1 uses an 80 channel multiplexer 104. In contrast, the data transmission system 200 illustrated in FIG. 2 may use two 40 channel multiplexers 104, for example As illustrated in FIG. 2, the data transmission system 200 may include a plurality of PAM4 100 Gb/s optical transceivers 101, each including an electrical PAM4 chip 103 generating two signals of 50 Gb/s data, with each 50 Gb/s data signal driving two 10G optical transmitters 102 with a total of two wavelengths and therefore two output optical fibers that are each connected to one of two multiplexers 104 in the illustrated example. In FIG. 2, the block labeled 'PAM4 (TX)' represents a dual PAM4 encoder. Generally, as of the writing of this application, there should be a 1:1 matching of PAM4 encoders and optical transmitters, but there can be multiple encoders on a single chip where more than one is utilized. A PAM4 chip 103 and the optical transmitters 102, together with the optical receivers 116 discussed below, make up 100 Gb/s transceivers. The 100 Gb/s transceivers 101 can be housed in a single QSFP28 module in this exemplary embodiment. Each of the two multiplexers 104 may be serially connected to half of the optical transmitters 102 and be configured to receive the data signals generated by the optical transmitters 102. The multiplexers 104 may multiplex the received DWDM signals into a single DWDM signal. Both of the multiplexers 104 may be serially connected to an optical interleaver or 2-to-1 combiner 202 to which the multiplexed signals are sent.

The optical interleaver or 2-to-1 combiner 202 may receive the DWDM signal from each of the two multiplexers and interleave or combine the two signals into a single interleaved or combined DWDM signal. As used herein, the optical interleaver is used to refer to both the optical interleaver and the 2-to-1 combiner embodiments. In some embodiments, the first multiplexer 104 may provide signals with even DWDM channels and the second multiplexer 104 may provide signals with odd DWDM channels, which may then be interleaved by the optical interleaver 202 into a single DWDM signal. The optical interleaver 202 may be serially connected to the first EDFA 106 and may send the interleaved signal to the first EDFA 106 for amplification prior to transmission over the SSMF link 108.

At the receiving end of the data transmission system 200, the second EDFA 112 may be serially connected to an optical deinterleaver 204. The compensated, amplified DWDM signal produced by the second EDFA 112 may be sent to the optical deinterleaver 204, which may be configured to deinterleave the signal into two separate DWDM signals. In embodiments in which an optical 2-to-1 combiner is used, the deinterleaver 204 would take the form of a 1×2 splitter. In an exemplary embodiment, the optical deinterleaver 204 may deinterleave the compensated, amplified signal into a first signal of all even DWDM channels and a second signal of all odd DWDM channels. The optical deinterleaver 204 may be serially connected with two demultiplexers 114 and may transmit the two signals generated via the deinterleaving to the respective two demultiplexers 114. The two demultiplexers 114 may then demultiplex the signals into two sets of 50 Gb/s signals, each of which may be transmitted to by optical fibers to respective optical receivers 116. The received 50 Gb/s signals are then input to the PAM4 chip 103, within an optical transceiver housed in a QSFP28 module, for example, that houses a pair of optical transmitters 102, a pair of optical receivers 116 and the PAM4 chip 103, in an exemplary embodiment. In exemplary embodiments, the two demultiplexers 114 may demultiplex the DWDM signals into a number of wavelengths corresponding to the number of wavelengths multiplexed by the two multiplexers 104.

For cost-savings, in the embodiment of FIG. 2, it is possible to use an optical modulator (e.g., a Mach-Zehnder or electro-absorption modulator) with only 10~15 GHz bandwidth. If a tunable laser is used, it may be integrated with a Mach-Zehnder modulator in a transmit optical sub-assembly (called Tunable TOSA or T-TOSA). In the case of a fixed-wavelength transmitter, a DWDM externally-modulated laser (EML), which is an integrated optical device with a continuous-wave (CW) laser and electro-absorption modulator, can be used. For instance, a fixed or a tunable CW laser can be used with a Mach-Zehnder modulator (MZM), and a driver amplifier.

In FIG. 2, a 100 Gb/s optical transceiver module are composed of two optical transmitters described above, with two output optical fibers. The EML can be optimized for 10G transceiver design. The T-TOSA may have a tunable light source such as a tunable laser diode In some embodiments, the data transmission system 200 may include the optical combiner 204, as mentioned above. For example, if the data transmission system 200 includes an optical combiner 202 configured to combine the DWDM signals from two 40 channel multiplexers 104, the receiving end of the data transmission system 200 uses an optical splitter 204 to separate the 40-channel even and 40-channel odd wavelengths.

In both the embodiments of FIG. 1 and of FIG. 2, a third EDFA (not illustrated) may be situated between the SMF link 108 and the dispersion compensator 110, and may be serially connected to each of the two components. The third EDFA 302 may be configured to receive the signal transmitted via the SMF link 108 and may amplify the signal prior to compensation by the dispersion compensator 110. In such embodiments, the length of the SSMF link 108 and/or nature of the link and/or transmitted signal may be such that loss occurs during the transmission for which amplification is needed. In such instances, the third EDFA may amplify the signal such that the dispersion compensator 110 can compensate for any accumulated fiber CD. The second EDFA 112 may still be used to amplify the signal once compensated, such as to account for loss suffered via the compensation done by the dispersion compensator 110.

In some embodiments, a data transmission system that is a combination of the systems 100 and 200 may be used. For example, the transmitting end may use the optical interleaver 202 and two multiplexers 104 and the receiving end may not use the optical deinterleaver 204 and have a single demultiplexer 114, but might also use the third EDFA 302. Such combinations may be used depending on the length of the SMF link 108, the amount of data being transmitted, the frequency or frequencies at which data is being transmitted, the type of dispersion compensator 110 being used, the type of optical transmitters 102 being used, the type of optical receivers 116 being used, etc.

In another example, the data transmission system may include one or more variable optical attenuators (VOAs), as mentioned above. In some instances, VOAs may be used for attenuation of the amplified signals, such as to ensure that amplified signals do not go above a predetermined threshold. VOAs (not illustrated) may be serially connected to EDFAs, such as the first EDFA 106, second EDFA 112, and third EDFA (not illustrated), or may be included in the EDFAs as components thereof.

In some embodiments, the data transmission system may also include additional components used to modify properties of the transmitted signals and/or data. For example, a digital signal processor may be used in the transmitting end of the data transmission system for pre-equalization of the signal, such as using a pre-Feed-Forward Equalizer (pre-FFE). In such an example, if pre-equalization reduces drive signal amplitude in the optical transmitters 102, drive signal amplitude may be further increased to compensate, such as to maintain a specific optical signal extinction ratio (ER).

Figure 3A:
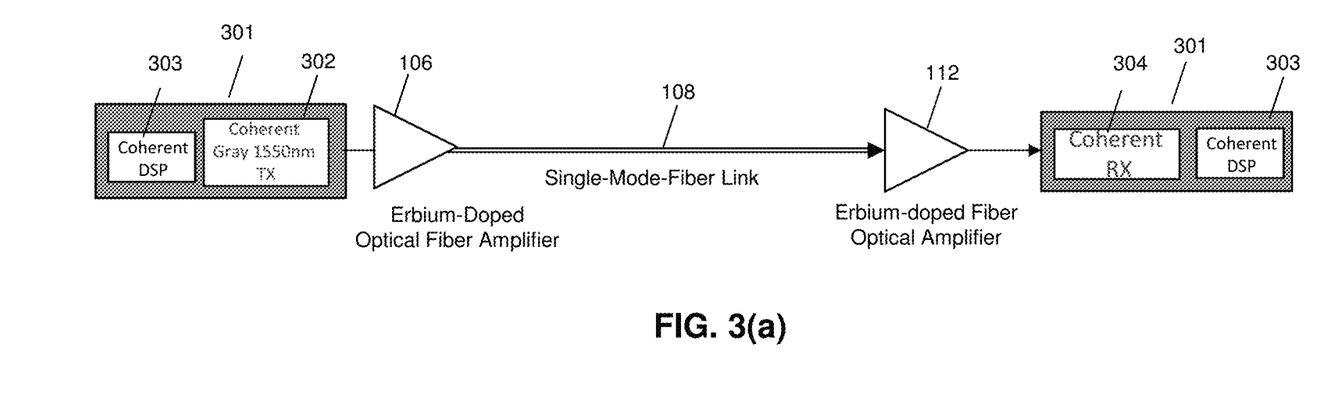
FIG. 3(a) is a block diagram illustrating a high capacity coherent data transmission system using a single wavelength in the 1550 nm, C-band and with erbium-doped-fiber amplifiers in accordance with exemplary embodiments.
Figure 3B:
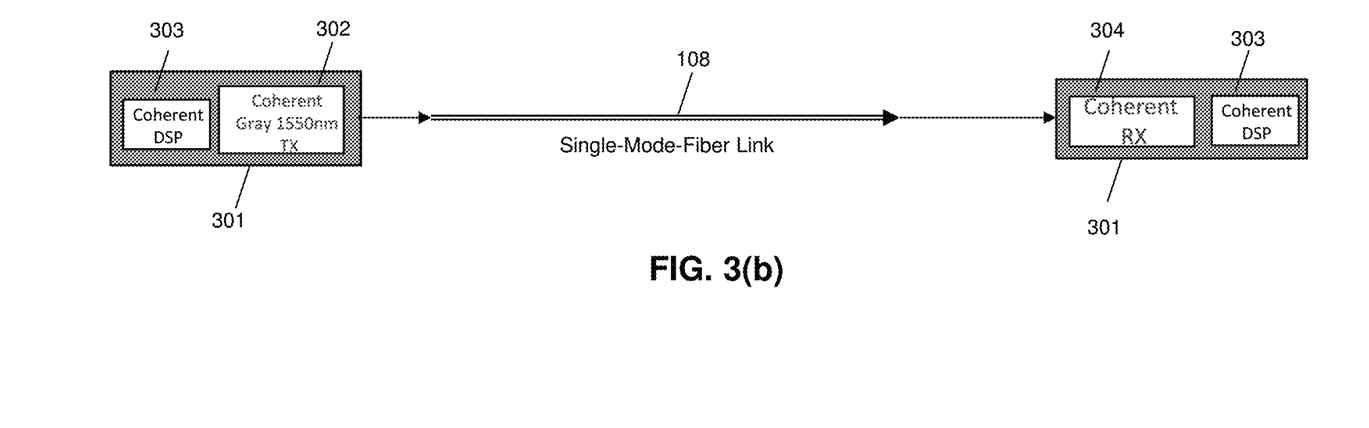
FIG. 3(b) is a block diagram illustrating a high capacity coherent data transmission system using a single wavelength in the 1550 nm, C-band and without erbium-doped-fiber amplifiers in accordance with exemplary embodiments.

As alternative configurations, FIGS. 3(a) and 3(b) show a high capacity transmission system using a single wavelength in C-band, grey (near 1550 nm) coherent-detection based modulation techniques. Coherent detection based modulation techniques are known. See, e.g., Ezra Ip et al., "Coherent detection in optical fiber systems," Optics Express 753, Vol. 16, No. 2, pub. 9 Jan. 2008. In FIG. 3(a) the system uses a pre-EDFA 106 and post-EDFA 112, relative to the SMF link 108. In the embodiment of FIG. 3(a), a non-tunable, C-band laser used for a coherent system without DWDM.

In FIG. 3(b), the system does not use any optical component, including no EDFAs, between an optical transmitter and an optical receiver, which are connected by a single mode fiber link 108. The components form a transceiver 301, which might be housed in a single common form factor (CFP), such as CFP, CFP2, CFP4 or QSFP, and include a coherent Gray 1550 nm transmitter, a coherent receiver and a coherent digital signal processor (DSP). The coherent modulation technique can be known DP-QPSK (dual-polarization quadrature phase shift keying (DPQPSK) modulation, which involves the polarization multiplexing of two different QPSK signals) or DP-16QAM (conventional dual-polarization (DP) 16-ary quadrature amplitude modulation), and can be evolved to DP-nQAM (dual polarization quadrature amplitude modulations where, e.g., n>16. The baud rate can be evolved from 28~32 Gbaud to 45~64 Gbaud or even higher.

Figure 4:
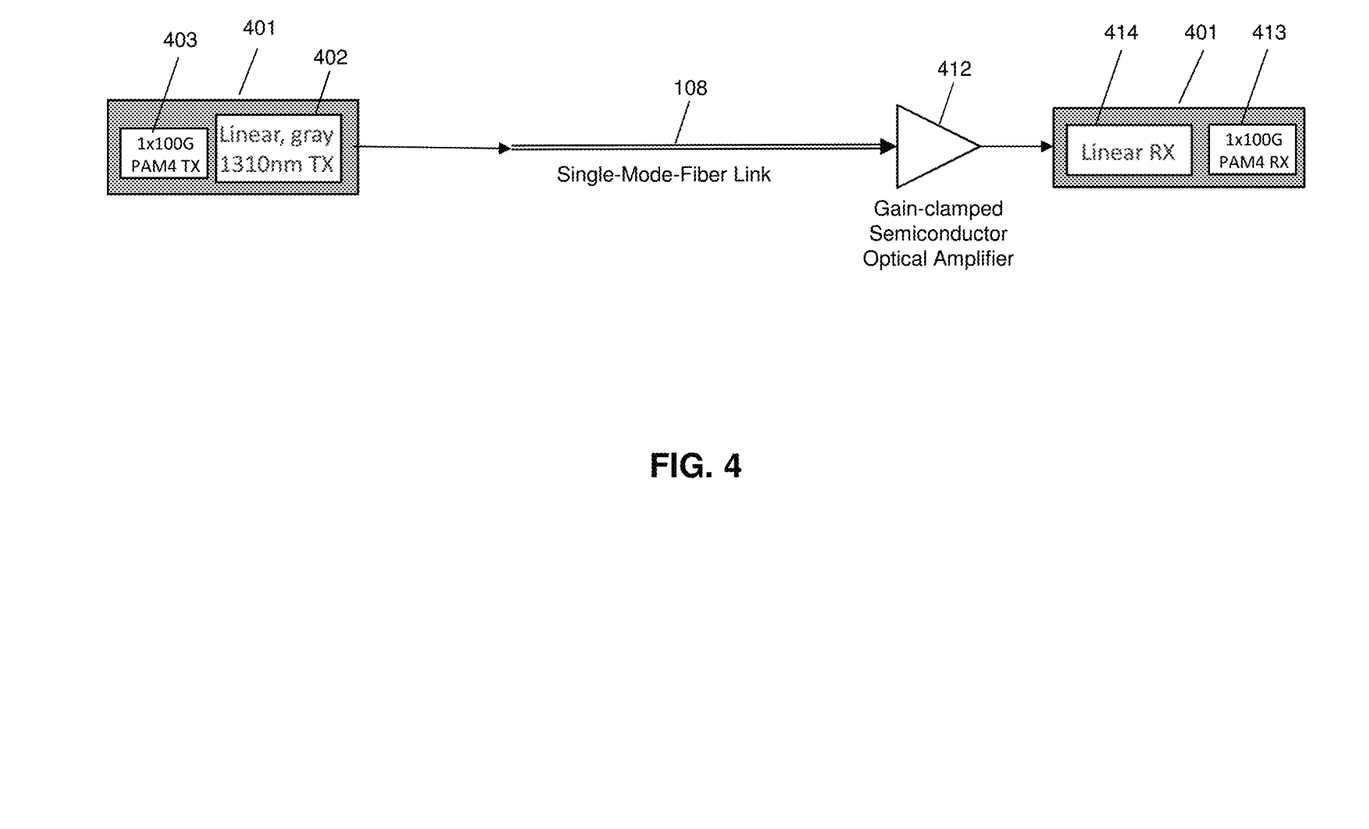
FIG. 4 is a block diagram illustrating a high capacity PAM4 data transmission system using a single 1310 nm wavelength and with a gain-clamped semiconductor optical amplifier in accordance with exemplary embodiments.

FIG. 4 shows a high capacity transmission system using a single wavelength in O-band (near 1310 nm) direct-detection PAM4 modulation. Optionally housed in a common CFP4 or QSFP28 module, for instance, a 1×1000 PAM4 transmitter 403 and 1×1000 PAM4 receiver 403 controls a linear, gray 1310 nm transmitter and 402 linear receiver 412, transceivers 401 can be placed on each end of a single-mode-fiber (SMF) link 108. The linear, gray 1310 nm transmitter can be in the form of a linear driver amplifier and a gray EML, and the receiver can be a PIN photodiode and a TIA. The transmitter and receiver specifications are similar to those in FIG. 2, except that the wavelength is now changed from C-band to O-band, and the transmitter wavelength does not have to be tunable because the entire system has only one optical transmitter. The optical amplifier is changed from EDFA to a 1.3 µm optical semiconductor optical amplifier (SOA), and may be based on a 1.3 µm directly modulated lasers (DML) or EML. Furthermore, as illustrated in Chan and Way, ("112 Gb/s PAM4 Transmission Over 40 km SSMF Using 1.3 µm Gain-Clamped Semiconductor Optical Amplifier," Optical Fiber Communications Conference (OFC), paper Th3A.4, March 2015) a gain-clamped SOA is preferred to increase the dynamic range of the SOA-based receiver.

In the embodiments of FIGS. 3a, 3b and 4, an electronic chip including of an analog-to-digital converter (ADC), a digital-to-analog converter (DAC), and digital-signal-processor (DSP) can be co-packaged in a module 301 and 401, with the optical coherent transmitter and receiver. The electronic chip can also be sitting outside the package 301, 401 of the optical coherent transmitter and receiver in an alternative embodiment. With respect to the embodiments of FIGS. 3a, 3b and 4, a product concept is a coherent transmitter using a non-tunable, C-band laser and a high-sensitivity coherent receiver without requiring DWDM multiplexer of demultiplexer, which can therefore do without EDFAs, if desired.

Method for High Capacity Data Transmission

Figure 5:
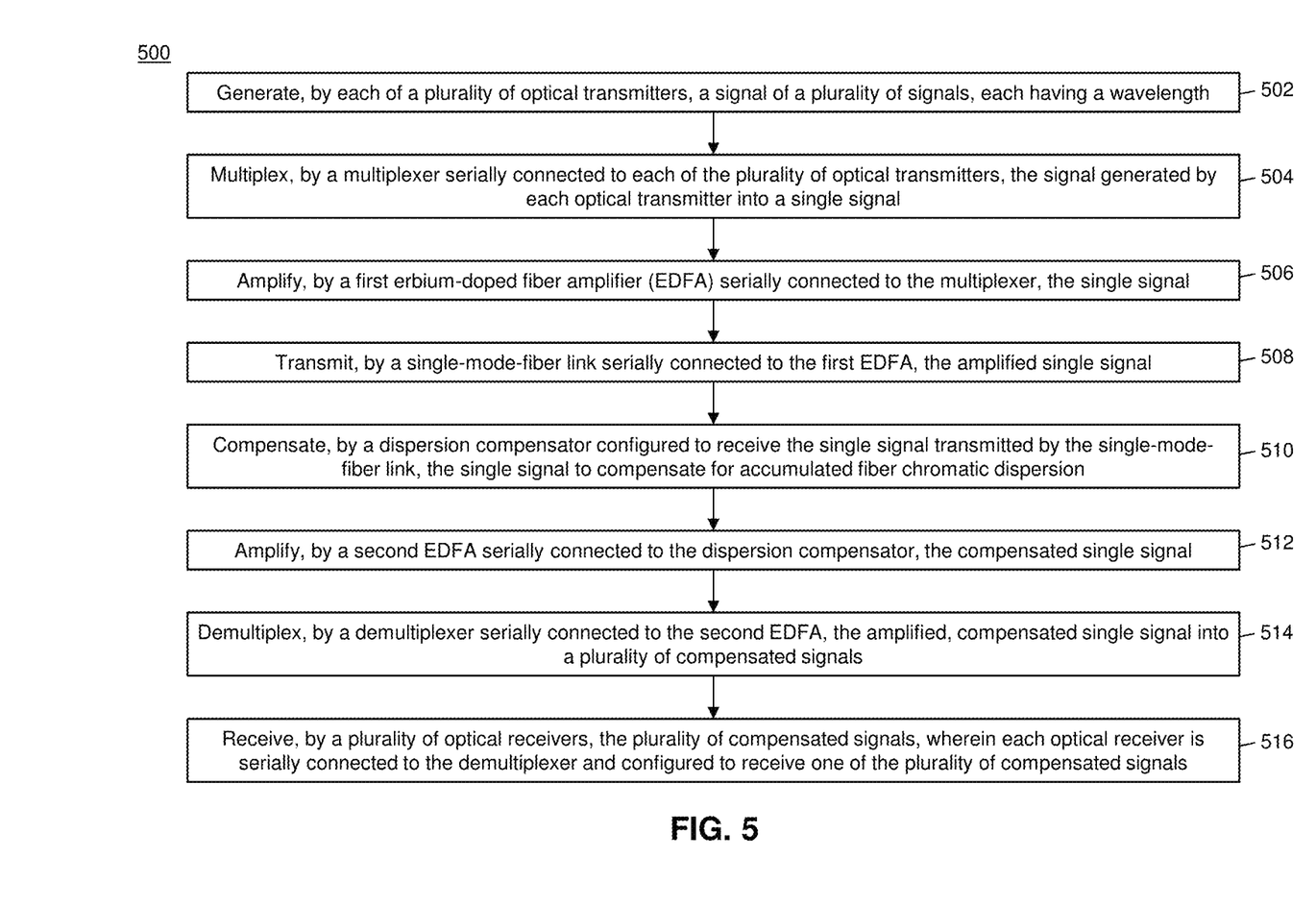
FIG. 5 is a flow chart illustrating an exemplary method for transmitting data in a data transmission system in accordance with exemplary embodiments.

With these various embodiments, overlapping methods of transmission are possible. For example, as shown in FIG. 5, a method employing the embodiments of FIGS. 1 and 2 is shown. FIG. 4 illustrates a method 400 for the transmission of data in a data transmission system, such as the data transmission system 100 or 200 of FIGS. 1, and 2, respectively.

In step 502, each of a plurality of optical transmitters (e.g., optical transmitters 102) may generate a signal of a plurality of signals, wherein each signal has a wavelength. In one embodiment, the plurality of optical transmitters may be direct detection-based pulse-amplitude-modulation with four amplitude level (PAM4) optical transmitters and comprise at least a digital-to-analog converter, a Mach-Zehnder modulator, and a tunable laser, or at least a digital-to-analog converter and a fixed-wavelength EML.

In step 504, a multiplexer (e.g., the multiplexer 104) serially connected to each of the plurality of optical transmitters may multiplex the signal generated by each optical transmitter into a single signal. In step 506, a first erbium-doped fiber amplifier (EDFA) (e.g., the first EDFA 106) serially connected to the multiplexer 104 may amplify the single signal. In step 508, the amplified single signal may be transmitted by a single-mode-fiber link (e.g., the SMF link 108) serially connected to the first EDFA. In one embodiment, the first EDFA may include a variable optical attenuator configured to attenuate the amplified signal prior to transmission via the single-mode-fiber link.

In step 510, a dispersion compensator (e.g., the dispersion compensator 110) configured to receive the single DWDM signal transmitted by the single-mode-fiber link may compensate the single DWDM signal for accumulated fiber chromatic dispersion. In some embodiments, the dispersion compensator may be one of: a tunable dispersion compensator, a fixed dispersion compensator, a dispersion compensation fiber, and a combination thereof. In one embodiment, the method 400 may further include amplifying, by a third EDFA (e.g., the third EDFA 302) serially connected to the single-mode-fiber link, the transmitted signal, wherein the dispersion compensator is serially connected to the third EDFA, and where the transmitted single signal received by the dispersion compensator is the single DWDM signal amplified by the third EDFA.

In step 512, the compensated single DWDM signal may be amplified by a second EDFA serially connected to the dispersion compensator. In step 514, a demultiplexer (e.g., the demultiplexer 114) serially connected to the second EDFA may demultiplex the amplified, compensated single DWDM signal into a plurality of compensated wavelengths. In some embodiments, the second EDFA may include a variable optical attenuator configured to attenuate the transmitted single signal prior to demultiplexing by the demultiplexer.

In step 516, the plurality of compensated signals may be received by a plurality of optical receivers (e.g., optical receivers 116), wherein each optical receiver is serially connected to the demultiplexer and configured to receive one of the plurality of compensated wavelengths. In some embodiments, each optical receiver may include at least a digital storage processor (DSP) configured to store process the respective received compensated signal. In the case of 2×50G PAM4, that there may be two optical receivers in a single optical transceiver module with two input fibers connecting to the two receivers, while in the case of 1×1000 PAM4, there is just one optical receiver in a single optical transceiver module with only one input fiber.

Figure 6:
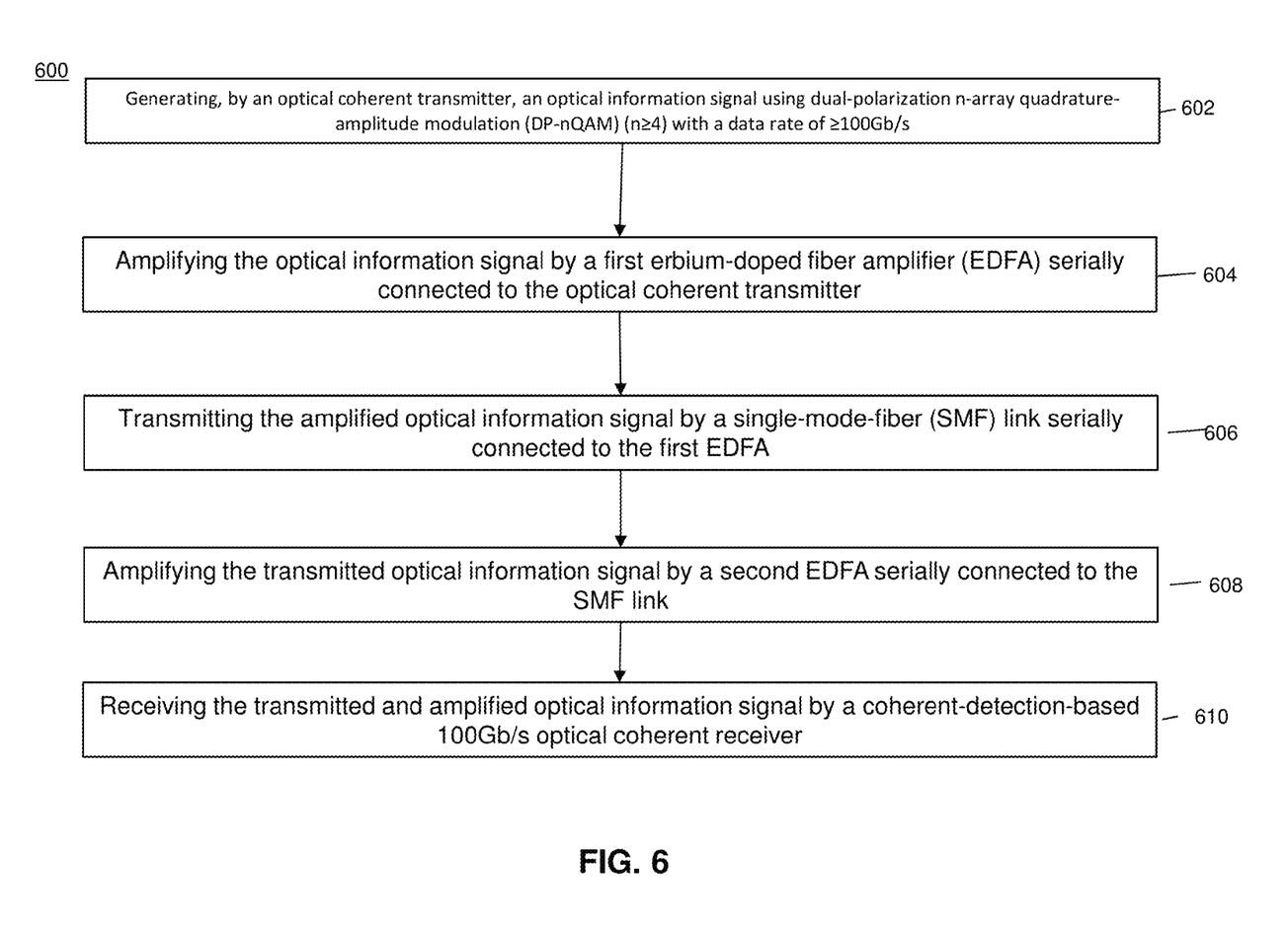
FIG. 6 is a flow chart illustrating an exemplary method for transmitting data in a data transmission system in accordance with exemplary embodiments.

In FIG. 6, a method employing the embodiments of FIGS. 3(*a*), 3(*b*) and 4 are shown. In this method for transmitting data in a data transmission system comprises a step 602 of generating, by an optical coherent transmitter, an optical information signal using dual-polarization n-array quadrature-amplitude modulation (DP-nQAM) (n≥4) with a data rate of ≥100 Gb/s. In step 604 the optical information signal is amplified by a first erbium-doped fiber amplifier (EDFA) serially connected to the optical coherent transmitter. In step 606 the amplified optical information signal is transmitted by a single-mode-fiber (SMF) link serially connected to the first EDFA. In step 608, the transmitted optical information signal is amplified by a second EDFA serially connected to the SMF link. In step 6010 the transmitted and amplified optical information signal is received by a coherent-detection-based 100 Gb/s optical coherent receiver.

Techniques consistent with the present disclosure provide, among other features, systems and methods for high capacity data transmission using a data transmission system. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope. For example, 50 Gb/s implies a data rate from 50 to approximately 56 Gb/s or higher, and 100 Gb/s implies a data rate from 100 to approximately 112 Gb/s or higher, depending on the forward-error-correction overhead. For another example, the number of EDFAs in a DWDM system can be more than two, as FIG. 1 illustrated. Further, the same concepts can be extended to 200G or higher data rate optical transceivers through direct application of the inventive principles to higher modulation rates, higher constellations, and/or greater multiplicity of wavelength channels.

What is claimed is:

1. A data transceiver module, comprising:
a plurality of optical transmitters, each optical transmitter being configured to receive an information bearing signal and generate an optical signal having a wavelength different from wavelengths generated by others of the plurality of optical transmitters;
a plurality of optical receivers, each optical receiver being configured to receive an optical signal having a wavelength matching one of the plurality of optical transmitters and convert it to an information bearing electrical signal; and
a four level pulse-amplitude-modulator (PAM4) chip generating a pulse-amplitude-modulated information bearing signal input to at least one optical transmitter of the plurality of optical transmitters and receiving the information bearing from at least one optical receiver of the plurality of optical receivers and converting it to an information signal using pulse amplitude demodulation.

2. The optical transceiver module of claim 1, further comprising a QSFP28 form factor housing containing the plurality of optical transmitters, the plurality of optical receivers and the PAM4 chip.

3. The optical transceiver module of claim 1, wherein each optical transmitter includes a driver amplifier and composed of one of: a fixed and a tunable optical EML.

4. The optical transceiver module of claim 1, wherein each optical transmitter includes a Mach-Zehnder modulator (MZM), and a driver amplifier and one of: a fixed or a tunable CW laser.

5. The optical transceiver module of claim 1, wherein the each optical transmitter can have a modulation bandwidth approximately equal to or greater than 10 GHz.

6. The optical transceiver module of claim 1, wherein each optical receiver is composed of one of a p-type, intrinsic, n-type photodiode (PIN) and an avalanche photodiode (APD) connected in series with a trans-impedance amplifier (TIA).

7. The optical transceiver module of claim 1, wherein each optical receiver has a bandwidth of approximately equal to or greater than 15 GHz.

8. The optical transceiver module of claim 1, wherein each PAM4 chip is configured to de-serialize 4×25 Gb/s non-return to zero (NRZ) data, and serialize the NRZ data into two streams of 50 Gb/s PAM4 data in one direction, and reverse the signal processing sequence in a different direction.

9. The optical transceiver module of claim 1, wherein each PAM4 chip includes a digital to analog converter (DAC), an analog to digital converter (ADC), a digital signal processing (DSP) unit, and a forward error correction (FEC) codec.

10. A data transmission system, comprising:
the optical transceiver of claim 1,
a multiplexer serially connected to each of the plurality of optical transmitters of the optical transceiver and configured to multiplex the optical signal generated by each optical transmitter into a single optical signal;
a first optical amplifier serially connected to the multiplexer configured to amplify the single optical signal;
a single-mode-fiber link serially connected to the first optical amplifier configured to transmit the amplified single optical signal;
a dispersion compensator configured to receive the single optical signal transmitted by the single-mode-fiber link and compensate for accumulated fiber chromatic dispersion, wherein the dispersion compensator is fixed and/or tunable;
a demultiplexer serially connected to dispersion compensator configured to demultiplex the amplified, compensated single optical signal into a plurality of compensated optical signals; and
a plurality of optical receivers of the optical transceiver, each optical receiver being serially connected to the demultiplexer and configured to receive one of the plurality of compensated optical signals.

11. The data transmission system of claim 10, wherein the first optical amplifier is a first erbium-doped fiber amplifier (EDFA).

12. The data transmission system of claim 11, further comprising a second EDFA serially connected between the dispersion compensator and the demultiplexer, and configured to amplify the compensated single optical signal.

13. The data transmission system of claim 12, further comprising:
a third EDFA serially connected to the single-mode-fiber link configured to receive and amplify the transmitted single optical signal, wherein
the dispersion compensator is serially connected to the third EDFA, and
the transmitted single optical signal received by the dispersion compensator is the single optical signal amplified by the third EDFA.

14. The data transmission system of claim 10, wherein the plurality of optical transmitters are direct detection-based pulse-amplitude-modulation with four amplitude level optical transmitters.

15. The data transmission system of claim 10, wherein the multiplexer comprises two separate multiplexers, each serially connected to a separate half of the plurality of optical transmitters of the optical transceiver module, and a serially connected optical interleaver serially connected to the first optical amplifier and the two separate multiplexers,
each separate multiplexer is configured to multiplex the signal generated by the connected separate half of the plurality of optical transmitters into a multiplexed signal, and
the optical interleaver is configured to interleave the multiplexed signal from each of the separate multiplexers into the single signal.

16. The data transmission system of claim 10, wherein the demultiplexer comprises an optical deinterleaver serially connected to the dispersion compensator and two separate demultiplexers, each serially connected to the optical deinterleaver and a separate half of the plurality of optical receivers,
the optical deinterleaver is configured to deinterleave the compensated single optical signal into two separate optical signals, and
each separate demultiplexer is configured to demultiplex one of the two separate optical signals deinterleaved by the optical deinterleaver into half of the plurality of compensated signals.

17. A data transmission system, comprising:
a plurality of four-level pulse-amplitude-modulation (PAM4) 100 Gb/s optical transceiver modules, each consisting of two 10G optical transmitters and an electrical PAM4 chip generating two signals of 50 Gb/s data, with each 50 Gb/s data signal driving the two 10G optical transmitters for a total of two wavelengths, wherein each data signal has a different wavelength;
a multiplexer serially connected to each of the plurality of optical 100 Gb/s transceivers configured to multiplex the two wavelength of the optical transceiver modules into a single optical DWDM signal;
a first optical amplifier serially connected to the multiplexer, amplifying the single optical DWDM signal;
a single-mode-fiber link serially connected to the first optical amplifier, configured to transmit the amplified single optical signal;
a dispersion compensator configured to receive the single optical DWDM signal transmitted by the single-mode-fiber link, and compensate the single optical DWDM signal to compensate for accumulated fiber chromatic dispersion, wherein the dispersion compensator is fixed and/or tunable;
a demultiplexer serially connected to the dispersion compensator, configured to demultiplex the amplified, compensated single optical DWDM signal into a plurality of compensated optical wavelengths; and
a plurality of four-level pulse-amplitude-modulation (PAM4) 100 Gb/s optical transceiver modules each including of two optical receivers, receiving the plurality of compensated optical signals, wherein each optical receiver is serially connected to the demultiplexer and configured to receive one of the plurality of compensated 50 Gb/s optical wavelengths and outputting electrical 50 Gb/s signal, and a PAM4 chip receiving the electrical 50 Gb/s signal for demodulation and decoding.

18. The data transmission system of claim 17, wherein the first optical amplifier is a first erbium-doped fiber amplifier (EDFA).

19. The data transmission system of claim 18, further comprising a second EDFA serially connected between the dispersion compensator and the demultiplexer, and configured to amplify the compensated single optical signal.

20. The data transmission system of claim 17, further comprising a QSFP28 form factor housing containing each of the optical transmitters, the plurality of optical receivers, and the PAM4 chip.

21. A data transmission system, comprising:
a plurality of >30 GHz optical transmitters, each optical transmitter being configured to generate an optical signal having a wavelength using PAM4 modulation and with >100 Gb/s data rate, wherein the wavelength for each optical signal is different from wavelengths of optical signals generated by others of the plurality of optical transmitters;
a multiplexer serially connected to each of the plurality of optical transmitters configured to multiplex the optical signal generated by each optical transmitter into a single optical dense-wavelength-division-multiplexed (DWDM) signal;
a first optical amplifier serially connected to the multiplexer and configured to amplify the optical single signal;
a single-mode-fiber link serially connected to the first optical amplifier configured to transmit the amplified single signal;
a dispersion compensator configured to receive the optical single signal transmitted by the single-mode-fiber link and compensate for accumulated fiber chromatic dispersion, wherein the dispersion compensator is fixed and/or tunable;
a demultiplexer serially connected to the dispersion compensator configured to demultiplex the amplified, compensated single optical DWDM signal into a plurality of compensated optical wavelengths; and
a plurality of optical receivers, each optical receiver having a bandwidth greater than or equal to approximately 30 GHz being serially connected to the demultiplexer and configured to receive one of the plurality of compensated optical wavelengths.

22. The data transmission system of claim 21, wherein the first optical amplifier is a first erbium-doped fiber amplifier (EDFA).

23. The data transmission system of claim 22, further comprising a second EDFA serially connected between the dispersion compensator and the demultiplexer, and configured to amplify the compensated single optical signal.

24. The data transmission system of claim 21, wherein at least two optical transmitters and at least two optical receivers are contained within a single optical module.

25. A method for transmitting data in a data transmission system comprising:
generating an optical information signal by using a coherent optical transmitter using dual-polarization n-array quadrature-amplitude modulation (DP-nQAM) (n≥4) with a data rate of ≥100 Gb/s;
transmitting the optical information signal by a single-mode-fiber (SMF) link serially connected to the optical coherent transmitter; and
receiving the transmitted optical information signal by a coherent-detection-based ≥100 Gb/s coherent optical receiver.

26. The data transmission system of claim 25, wherein the coherent receiver is a C-band, high-sensitivity coherent receiver.

27. The data transmission system of claim 25, wherein the coherent optical transmitter includes a non-tunable laser in C-band.

28. A method for transmitting data in a data transmission system, comprising:
generating, by each of a plurality of optical transmitters, an optical signal of a plurality of signals, each having a wavelength different from wavelengths generated by others of the plurality of optical transmitters;
multiplexing, by a multiplexer serially connected to each of the plurality of optical transmitters, the signal generated by each optical transmitter into a single optical signal;
amplifying, by a first optical amplifier serially connected to the multiplexer, the single optical signal;
transmitting, by a single-mode-fiber link serially connected to the first optical amplifier, the amplified single optical signal; and
compensating, by a dispersion compensator configured to receive the single optical signal transmitted by the single-mode-fiber link, the single optical signal to compensate for accumulated fiber chromatic dispersion, wherein the dispersion compensator is fixed and/or tunable;
demultiplexing, by a demultiplexer serially connected to the dispersion compensator, the compensated single signal into a plurality of compensated signals; and
receiving, by a plurality of optical receivers, the plurality of compensated signals, wherein each optical receiver is serially connected to the demultiplexer and configured to receive one of the plurality of compensated signals.

29. The method of claim 28, wherein the plurality of optical transmitters are direct detection-based pulse-amplitude-modulation with four amplitude level optical transmitters and comprise at least a digital-to-analog converter, a Mach-Zehnder modulator, and a tunable laser.

30. The method of claim 28, wherein the first optical amplifier is a first erbium-doped fiber amplifier (EDFA).

31. The method of claim 30, further comprising amplifying the compensated signal by a second EDFA configured to amplify the compensated single optical signal before being received by the plurality of optical receivers.

32. The method of claim 28, wherein the dispersion compensator is one of: a tunable dispersion compensator, a fixed dispersion compensator, a dispersion compensation fiber, and a combination thereof.

33. The method of claim 28, wherein the generating an optical signal of a plurality of signals is by a coherent optical transmitter that includes a non-tunable laser in C-band.

34. The method of claim 28, further comprising a QSFP28 form factor housing containing the plurality of optical transmitters and the plurality of optical receivers.

35. A data transmission system, comprising:
a plurality of four-level pulse-amplitude-modulation (PAM4) 100 Gb/s optical transceiver modules, each consisting of one optical transmitter and an electrical PAM4 chip generating a signal of 100 Gb/s data, wherein each data signal has a different wavelength;
a multiplexer serially connected to each of the plurality of optical 100 Gb/s transceivers configured to multiplex the two wavelength of the optical transceiver modules into a single optical DWDM signal;
a first optical amplifier serially connected to the multiplexer, amplifying the single optical DWDM signal;
a single-mode-fiber link serially connected to the first optical amplifier, configured to transmit the amplified single optical signal;
a dispersion compensator configured to receive the single optical DWDM signal transmitted by the single-mode-fiber link, and compensate the single optical DWDM signal to compensate for accumulated fiber chromatic dispersion, wherein the dispersion compensator is fixed and tunable;

a demultiplexer serially connected to the dispersion compensator, configured to demultiplex the amplified, compensated single optical DWDM signal into a plurality of compensated optical wavelengths; and a plurality of four-level pulse-amplitude-modulation (PAM4) 100 Gb/s optical transceiver modules each including one optical receiver, receiving the plurality of compensated optical signals, wherein each optical receiver is serially connected to the demultiplexer and configured to receive one of the plurality of compensated 100 Gb/s optical wavelengths and outputting electrical 100 Gb/s signal, and a PAM4 chip receiving the electrical 100 Gb/s signal for demodulation and decoding.

36. The data transmission system of claim 35, further comprising a QSFP28 form factor housing containing each of the optical transmitters, the plurality of optical receivers, and the PAM4 chip.

37. The data transmission system of claim 35, wherein the first optical amplifier is a first erbium-doped fiber amplifier (EDFA).

\* \* \* \* \*